Patented July 8, 1947

2,423,545

UNITED STATES PATENT OFFICE 2,423,545

ESTERIFICATION OF TERPENE ALCOHOLS

Max E. Aeschbach, Pompton Plains, N. J., assignor to Norda Essential Oil & Chemical Company, Inc., New York, N. Y., a corporation of New York No Drawing. Application July 13, 1944,
Serial No. 544,834

7 Claims. (Cl. 260—489)

This invention relates to the esterification of terpene alcohols, especially those having the general formula: $C_{10}H_{17}OH$. More particularly, the invention relates to the esterification of tertiary alcohols, such as linalool and terpineol, with an acid anhydride and accompanied by the removal of the free acid by-product by azeotropic distillation during the course of the reaction.

Terpene alcohols are found in a wide variety of naturally occurring essential oils. The esters of these oils in general are more fragrant and more desirable in the perfume industry. The art has been concerned, therefore, with processes of esterifying these alcohols, particularly to form the lower molecular weight fatty acid esters thereof.

The acetylation of certain alcohols which are easy to esterify can be accomplished quite easily by heating with acetic acid or with acetic anhydride. Usually the mixture is heated to the boiling point for an hour or longer. The ultimate by-product of these reactions is water and it has been proposed to distill the water from the reaction mixture in the form of a binary azeotrope using toluene, for example, as the entrainer. Toluene forms as a binary azeotrope with water boiling at about 84.1° C. and since this is much lower than the boiling point of the water, acetic acid and acetic anhydride, the removal of the water can be accomplished with facility.

The acetylation of certain terpene alcohols, such as geraniol, can be accomplished readily with acetic anhydride and the geranyl acetate separated from the by-product acetic acid and any unreacted anhydride by fractional distillation.

This procedure cannot be employed to acylate the tertiary terpene alcohols, such as linalool and terpineol. Linalool, for example, has the formula:

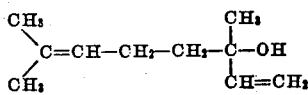

and terpineol has the formula:

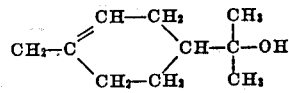

It will be seen that in both of these alcohols the OH group is attached to a carbon atom to which three other carbon atoms are attached. These alcohols are particularly difficult to esterify to any reasonably high yields without decomposition. When acetic anhydride is employed as the esterifying agent the free acetic acid formed as the by-product prevents the esterification from going to an economically high level at a moderate temperature and causes undesirable side reactions. Linalool, in particular, is very sensitive to free acid. When higher temperatures are employed in an attempt to obtain greater yields, the linalool undergoes changes to geraniol or terpineol which are in turn esterified. The esters of the latter are undesirable in a final linalool ester product and are not easily separated by fractionation.

These difficulties have been recognized and the elimination of the free acid by-product can be accomplished by the addition of a rather large amount of pyridine which reacts only with the free acid and not with the acetic anhydride. Calcium carbide in the form of a coarse powder can be added to obtain much the same effect. The use of these materials for eliminating the liberated free acid, however, is undesirable in an economic large scale operation.

It is an object of my invention to esterify terpene alcohols, and more particularly the tertiary terpenols such as linalool, to obtain high yields of the ester in a simple esterification and distillation operation.

Another object of the invention is the provision of an esterification process using an acid anhydride as the esterifying reagent and in which the free acid liberated in the reaction is removed azeotropically.

Still a further object of the invention is the provision of a process in which a mixed anhydride of acetic acid and a higher fatty acid is used as the esterifying reagent to form the ester of the higher fatty acid.

I have discovered that terpene alcohols, including the difficultly esterifiable linalool, can be esterified with an anhydride of a lower fatty acid, such as acetic anhydride, or the mixed anhydride of acetic and a higher fatty acid, and the free acetic acid by-product removed during the course of the reaction by distillation as a binary azeotrope having a boiling point lower than the boiling point of the acetic acid, the acetic anhydride, and the azeotrope of the anhydride and the entrainer, so that the yields of the ester run almost quantitatively.

Some of the most desirable materials in the perfume industry are the linalyl esters, such as linalyl acetate and linalyl butyrate and isobutyrate, which occur in natural oil of lavender. The linalyl alcohol or linalool is readily available but it is not as valuable as its esters. It is desirable to prepare these esters artificially, since they are in demand in large quantities for the purpose of scenting soaps.

The following example will illustrate a commercially adaptable embodiment of my invention and I include it merely as illustrative thereof, following which I will indicate the variations that may be made without departing essentially from the scope of my invention as defined heretofore and in the subsequent claims.

Example I

A glass-lined kettle was charged with 240 pounds of "Ho" oil containing 90% or 216 pounds of linalool, 140 pounds of 95% technical acetic anhydride, 20 pounds of sodium acetate (which is a conventional acetylation catalyst) and 460 pounds of toluene as the azeotropic entrainer. This mixture was heated under reflux at a temperature of about 119° C. for about 8 hours. Following this, 80 pounds of toluene was added and was then slowly distilled from the reaction mixture. This amount of toluene removed with it 16.7 volume per cent of acetic acid formed during the reaction. The reaction kettle was charged with 70 pounds more of acetic anhydride, refluxed for 6 hours, and 130 pounds more toluene was distilled off slowly at a temperature of 105° to 108° C. at atmospheric pressure, the distillate containing about 20 grams of acetic acid for each 100 c. c. thereof. Refluxing 8 hours longer without distillations brought the content of acetylated linalool up to the desired yield as indicated by analysis of a small sample removed from the reaction kettle. The mixture was cooled and washed with water and neutralized with soda ash and again washed with water. The excess toluene, for the most part, can be distilled out at atmospheric pressure until a temperature of about 140° C. is obtained, following which the contents are transferred to a vacuum still with the fractionating column and fractionated at a total pressure of about 4 mm. mercury. The reaction mixture for the most part distills at a temperature of 72° to 86° C. under this vacuum and the first fraction contains some terpenes and unreacted linalool which can be reprocessed in the next batch. From this reaction mixture there is obtained 190 pounds of 91% linalyl acetate as a salable product. This contains a very high ester concentration as compared with that obtained by known processes. There is also recovered 75 pounds of a lower fraction, which can be reprocessed, and 15 pounds of a residue containing less than 1% of the ester. Without considering the amount recoverable from the lower fraction there is a net yield of 80% which is much higher than the art has heretofore accomplished.

Example II

Oil of petitgrain Paraguay, contains about 40% linalool and about 45% linalyl acetate naturally occurring in the oil. An aluminum kettle, provided with an 8 inch column filled with "berl saddles" is charged with 180 pounds of oil of petitgrain Paraguay and 340 pounds of xylene. A vacuum of about 55 mm. mercury total pressure is placed on the column and about 40 pounds of xylene are distilled, which removes about 2 pounds of water which was contained in the oil of petitgrain Paraguay. To the reaction kettle is now added 55 pounds of 95% technical acetic anhydride, 6 pounds of anhydrous sodium acetate and 55 pounds of xylene. The reaction kettle is heated and refluxed, following which 54 pounds of xylene containing acetic acid in the form of a binary azeotrope is distilled gradually during 3 hours at atmospheric pressure. The binary azeotrope distills at about 115° to 118° C. and contains 334 grams of acetic acid per liter of distillate. Following this 30 more pounds of acetic anhydride and 60 more pounds of xylene is added to the kettle and the reaction continued. During the next 2½ hours 35 pounds more of the xylene-acetic acid azeotrope is distilled off. The kettle is then cooled to about 70° C. and the contents washed twice with a small amount of water. The reaction mixture is then neutralized with a solution of soda ash and the excess of xylene is distilled under an absolute pressure of about 50 to 60 mm. of mercury. Some 360 pounds of xylene, including the xylene recovered in the azeotropic distillation are recovered.

The residue, after washing and neutralizing, is then charged to a fractionation apparatus and distilled at a total pressure of about 5 mm. of mercury. The fraction collected as the salable product amounted to 163 pounds and contained 90% of linalyl acetate on a yield of 90.5% of the 90% ester product. The lower fractions distilled were reesterified in the next reaction batch. Only 8 pounds were lost in the still as residue. No fraction showed a boiling point which would indicate the formation of geranyl or terpinyl acetates.

In the above examples the exact details as to the proportions, the length of the reaction, etc. can be varied. Preferably the anhydride should be at least equal to the theoretical quantity for complete esterification, or it may be in excess. It may be added initially or stepwise through the process. Both the alcohol and anhydride may be added stepwise to make a continuous or semi-continuous process. The amount of the entrainer should be at least equal to that necessary to form the azeotrope with the theoretical amount of acid to be liberated. Preferably it should be in excess. It may be added initially, stepwise or continuously. The length of reaction time and the rate of distilling the by-product acid may be adjusted to the rate of the reaction and can be readily determined by withdrawing and analyzing samples. It is important that the acid be removed during the reaction or that the reaction continue after the removal of acid. It may be removed stepwise or continuously, as convenience indicates. All such details are readily understood by those skilled in the art. The catalyst used is not critical and may be omitted if the longer reaction time is not objectionable. Any non-acid reacting esterifying catalyst may be used. The reaction is preferably carried out under reflux, at atmospheric pressure, but may be carried out at a lower temperature, or under vacuum if desired. Generally there is no advantage because the reaction rate is slower. The reaction may be carried out under pressure and at a higher corresponding temperature. If the acid is removed as fast as formed there is less objection to the use of higher temperatures.

By the use of an entrainer to remove the by-product acetic acid during the course of the reaction, a high yield of the linalyl acetate is obtained. This is to be distinguished from the removal of water or the removal of acid after the reaction is completed.

The entrainer to be selected should be one which forms an azeotrope with acetic acid having a boiling point lower than the entrainer, the acetic acid and the azeotrope of the entrainer and the acetic anhydride. Toluene is preferred, but xylene and chlorobenzene may also be used. The entrainers suitable for this purpose are well known in the art and include, for example, n-heptane, n-octane and various halogenated hydrocarbons.

The process of the invention can also be employed for the manufacture of higher esters of the tertiary or other terpene alcohols. For example, the esters of butyric, isobutyric, isovaleric, phenylacetic and other acids with geraniol, terpineol, linalool, citronellol, carvestrol, etc., may be prepared by the process of the invention. These higher esters are often desirable as scents in perfume and soap making and would have been used more widely if they could have been prepared more readily.

In the manufacture of these higher esters the double anhydride is required, i. e., the anhydride of acetic acid and the higher acid. For example, if it is desired to prepare the butyric ester of a terpene alcohol, the butyric-acetic anhydride is reacted with the terpene alcohol in the presence of toluene or other entrainer. The acetic acid liberated in the reaction is distilled off azeotropically with the entrainer and the higher acid radical of the mixed anhydride combines with the terpene alcohol to form the ester. In the case of the formation of a butyrate of a terpene alcohol, the reaction would be as follows:

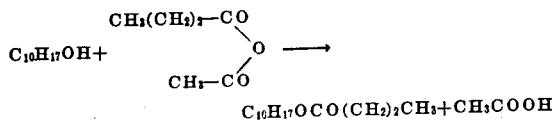

$$C_{10}H_{17}OCO(CH_2)_2CH_3 + CH_3COOH$$

In the manufacture of esters of isobutyric acid or phenylacetic acid, and other cases where the mixed anhydride of such acid with acetic acid is not readily available, it is first necessary to make the anhydride. The following examples are illustrative:

*Example III*

A 5 liter flask is charged with 1800 grams of isobutyric acid and 2200 grams of acetic anhydride. The flask is connected with a Vigreux column 30" in length. The flask is heated in an oil bath and 1145 grams of acetic acid is distilled off at the top of the column. The residue consists of the mixed isobutyric-acetic anhydride. After cooling, the mixed anhydride is removed from the flask. A yield of 2830 grams of the mixed anhydride is obtained.

The esterification may be carried out in a similar 5 liter flask on which is mounted a column 15" in length. To this flask is charged 1300 grams of oil of bois de rose containing 90% linalool, 1400 grams of the mixed anhydride prepared as above described, 500 cc. toluene and 30 grams of anhydrous sodium acetate. The reaction mixture is heated over a period of 24 hours and gradually and slowly during this time there is distilled off about 400 cc. of the toluene-acetic acid azeotrope containing about 112 grams of acetic acid per liter. After the acetic acid is thus removed azeotropically, the reaction mixture is refluxed 3 hours longer.

The reaction mixture is cooled and the contents of the flask washed with water and neutralized with soda ash solution and then fractionated under a vacuum. Toluene is first recovered at a vacuum of about 3 mm. mercury absolute pressure, following which 1387 grams of linalyl isobutyrate of good quality is obtained. About 100 grams of residue remains in the still.

*Example IV*

Geranyl isobutyrate may be prepared as follows:

A copper still provided with a column eight feet high is charged with 72 pounds of isobutyric acid and 88 pounds of acetic anhydride. The still is heated and about 48 pounds of acetic acid is distilled off slowly. The residue of 112 pounds comprises the mixed isobutyric-acetic anhydride.

In a larger reaction kettle provided with a column is charged 68 pounds of the mixed anhydride prepared as above described, 50 pounds of 90% geraniol, 3 pounds of anhydrous sodium acetate, and 300 pounds of toluene. This mixture is heated and 190 pounds of toluene-acetic acid binary azeotrope containing about 15% acetic acid is distilled therefrom during the course of 20 hours. After the acetic acid is thus removed, the reaction mixture is heated for about 4 hours longer under reflux and washed and neutralized as described in the previous examples. The remaining mixture is subjected to distillation and there is recovered 56 pounds of geranyl isobutyrate of 100% strength which boils at 86–96° C. at 3 mm. mercury absolute pressure. The manufacture of esters of geraniol is simpler and a better yield is obtained than is the case with tertiary alcohols such as linalool.

The preparation of terpene esters of other higher fatty acids, such as isovaleric priopionic, phenylacetic, etc. may be prepared in a similar manner by first preparing the corresponding mixed anhydride and then reacting this with the terpene alcohol. The specific examples given are not meant as a limitation on the esters that may be made. The aromatic and the aliphatic acid radicals of less than 8 carbon atoms are of particular significance. The esterification is subject to all of the variations of the procedure described in connection with Examples I and II.

While my process is applicable in general to the esterification of any terpene alcohol, it is especially adapted to the esterification of tertiary terpene alcohols which have been particularly difficult to esterify in which good yields by any of the prior art processes are obtained. In some instances the esterification of the more readily esterified terpene alcohols, such as geraniol, may be accomplished satisfactorily by prior methods with satisfactory yields. This is not meant to say, however, that my new process cannot be used for their esterification. I have selected linalool as illustrative of my process because it is the most difficult of the terpene alcohols to esterify and a process which satisfactorily accomplishes its esterification would be expected to esterify the other terpene alcohols.

My process may employ a variety of materials, as indicated, and may be subject to variations in procedure, as described. All of the same will be obvious to one skilled in the art, in view of the disclosure herein, and are intended to be included in the invention if within the scope of the following claims.

I claim:

1. A process of esterifying a terpene alcohol with a diacyl anhydride of acetic acid under conditions such that free acetic acid is formed as a by-product, which acid interferes with the esterification reaction, which comprises reacting the said alcohol with the said anhydride in the presence of an entrainer which forms with acetic acid a binary azeotrope boiling lower than any of the ingredients in the reaction mixture, and distilling said azeotrope from the reaction mixture as acetic acid is formed.

2. A process of esterifying a tertiary terpene alcohol with a diacyl anhydride of acetic acid under conditions such that free acetic acid is formed as a by-product, which acid interferes with the esterification reaction, which comprises reacting the said alcohol with the said anhydride in the presence of an entrainer which forms with acetic acid a binary azeotrope boiling lower than any of the ingredients in the reaction mixture, and distilling said azeotrope from the reaction mixture as acetic acid is formed.

3. A process of esterifying linalool with a diacyl anhydride of acetic acid under conditions such that free acetic acid is formed as a by-product, which acid interferes with the esterification reaction, which comprises reacting the said alcohol with the said anhydride in the presence of an entrainer which forms with acetic acid a binary azeotrope boiling lower than any of the ingredients in the reaction mixture, and distilling said azeotrope from the reaction mixture as acetic acid is formed.

4. A process of esterifying linalool with a diacyl anhydride of acetic acid under conditions such that free acetic acid is formed as a by-product, which acid interferes with the esterification reaction, which comprises reacting the said alcohol with the said anhydride in the presence of toluene which forms with acetic acid a binary azeotrope boiling lower than any of the ingredients in the reaction mixture, and distilling said azeotrope from the reaction mixture as acetic acid is formed.

5. A process of esterifying a terpene alcohol with acetic anhydride under conditions such that free acetic acid is formed as a by-product, which acid interferes with the esterification reaction, which comprises reacting the said alcohol with the said anhydride in the presence of toluene which forms with acetic acid a binary azeotrope boiling lower than any of the ingredients in the reaction mixture, and distilling said azeotrope from the reaction mixture as acetic acid is formed.

6. A process of esterifying linalool with acetic anhydride under conditions such that free acetic acid is formed as a by-product, which acid interferes with the esterification reaction, which comprises reacting the said alcohol with the said anhydride in the presence of toluene which forms with acetic acid a binary azeotrope boiling lower than any of the ingredients in the reaction mixture, and distilling said azeotrope from the reaction mixture as acetic acid is formed.

7. A process of esterifying a terpene alcohol with a diacyl anhydride of acetic acid under conditions such that free acetic acid is formed as a by-product, which acid interferes with the esterification reaction, which comprises reacting the said alcohol with the said anhydride in the presence of an entrainer which forms with acetic acid a binary azeotrope boiling lower than any of the ingredients in the reaction mixture, and distilling said azeotrope during an early stage of the reaction to prevent accumulation of acetic acid as a harmful by-product in the reaction mixture as the reaction is proceeding.

MAX E. AESCHBACH.

REFERENCES CITED

The following references are of record in the file of this patent:

UNITED STATES PATENTS

| Number | Name | Date |
| --- | --- | --- |
| 2,272,400 | Borglin | Feb. 10, 1942 |
| 648,580 | Behal | May 1, 1900 |

OTHER REFERENCES

Fornet, "Seifensieder Zeitung," vol. 63 (1936), pp. 739–40 (avail. in Pat. Off. Lib.).